United States Patent Office 3,557,140
Patented Jan. 19, 1971

3,557,140
PROCESS FOR THE PRODUCTION OF POLY-N-OXIDES
Gustav Pieper, Cologne-Stammheim, Wulf von Bonin, Leverkusen, and Ekkehard Grundmann, Wuppertal-Elberfeld, Germany, assignors to Farbenfabriken Bayer Aktiengesellschaft, Leverkusen, Germany, a corporation of Germany
No Drawing. Filed Mar. 7, 1968, Ser. No. 711,211
Claims priority, application Germany, Mar. 25, 1967, F 51,950
Int. Cl. C07d 27/10
U.S. Cl. 260—326.3           8 Claims

ABSTRACT OF THE DISCLOSURE

Poly-N-oxides useful in the treating of silicosis and a procedure for making the same and administering them are provided. The poly-N-oxides have the formula:

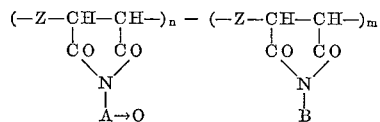

in which Z is the monomer unit of a vinyl compound of the formula:

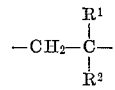

which is copolymerized with maleic acid anhydride and wherein $R^1$ and $R^2$ stand for the same or different radicals such as hydrogen, alkyl with 1–4 carbon atoms, cycloalkyl with 3 to 6 carbon atoms, phenyl or phenyl substituted by lower alkyl, and wherein one of $R^1$ and $R^2$ may be one of CN, $CONH_2$, COOH, COOR, OR, or OCOR in which R is alkyl with 1 to 4 carbon atoms. The monomer unit which is polymerized with maleic anhydride may also be styrene or isobutylene or ethylene; A→O stands for the radical A of a primary-tertiary polyamine wherein at least one tertiary amino group has been oxidized to N-oxide, and wherein A has the formula:

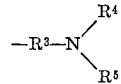

wherein $R^3$ is alkylene, phenylene or alkylphenylene with up to 7 carbon atoms of which one $CH_2$ group may be replaced by an oxygen atom; $R^4$ and $R^5$ are lower alkyl with 1 to 4 carbon atoms which, when linked with the nitrogen atom, form a 5 to 7-membered cyclic ring system which, in the case of a 6-membered ring, may contain, as further hetero atom, oxygen, or a nitrogen atom which is substituted by a lower alkyl group; and the heterocyclic ring system being aromatic when no further hetero atoms are present; B stands for an aliphatic, cycloaliphatic, aromatic or heterocyclic radical of a primary monoamine of up to 12 carbon atoms, and which are unsubstituted or substituted by OH or lower alkyl; n and m are integers, whereby the ratio of $n:m$ is 90:10 to 60:40, the sum $n+m$ signifying the polymerization degree of the maleic acid anhydride copolymer ranging between 50 and 500.

Poly-2-vinylpyridine-N-oxide is known as an agent for combating experimental silicosis in rats from the publications by H. W. Schlipköter and A. Brockhaus. Also poly-4-vinylpyridine-N-oxide exhibits a certain, although substantially weaker, activity against silicosis, whereas negative results were obtained with numerous other polyamines of their N-oxides. Poly-2-vinylpyridine-N-oxide has a sufficient activity only in the case of a very high molecular weight so that the production and application encounters substantial difficulties.

The polyimidaminoxides which are obtainable from copolymers of maleic acid anhydride by condensation with primary-tertiary polyamines to yield polyamidamines, cyclisation to yield polyimidamines and oxidation, are known in the art and show a high activity against silicosis in test animals. The oxidation step to yield polyimidaminoxides can also be effected prior to the cyclisation step.

In accordance with the present invention it has now been found that the condensation with copolymers of maleic acid anhydride can also be accomplished by substituting primary monoamines for 10–60% of the relatively difficultly available primary-tertiary polyamines, without the activity against silicosis of the polyimidaminoxides resulting after cyclisation and oxidation being deleteriously affected. It is possible to modify in this manner the physical and chemical properties of the preparations, e.g. by increasing or reducing the solubility thereof, thereby adapting the preparations to the requirements in practice.

The reaction according to the invention is illustrated by the following reaction equation:

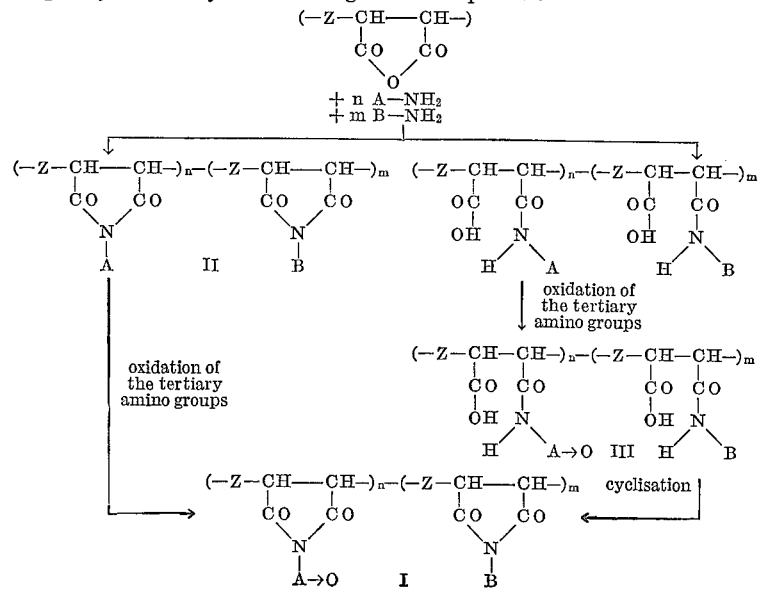

In the reaction equation and in particular in the general Formula I for polyimidaminoxides, the symbols are intended to denote:

Z the monomer unit of a vinyl compound of the formula

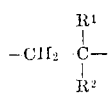

which is copolymerised with maleic acid anhydride and wherein $R^1$ and $R^2$ stand for equal or different radicals such as hydrogen, alkyl with 1–4 carbon atoms, cycloalkyl with 3 to 6, preferably 6, carbon atoms, a phenyl radical which may be substituted by a lower alkyl group, and wherein one of the two radicals $R^1$ and $R^2$ may also denote one of the groups CN, $CONH_2$, COOH, COOR, OR, OCOR (R=alkyl with 1 to 4 carbon atoms). The monomer unit which is polymerized with maleic anhydride may also be styrene or isobutylene or ethylene.

A→O stands for the radical A of a primary-tertiary polyamine wherein at least one tertiary amino group has been oxidised to N-oxide, and wherein A corresponds to the general formula

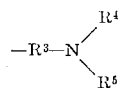

wherein $R^3$ means an alkylene, phenylene or alkylphenylene group with up to 7 carbon atoms (one $CH_2$ group may be replaced by an oxygen atom); $R^4$ and $R^5$ are lower alkyl groups with 1 to 4 carbon atoms which, optionally together with the nitrogen atom, may be constituents of a 5 to 7-membered cyclic ring system which, in the case of a 6-membered ring, may contain, as further hetero atom, oxygen, or a nitrogen atom which is substituted by a lower alkyl group; and the heterocyclic ring system may also be aromatic if no further hetero atoms are present; B stands for an aliphatic, cycloaliphatic, aromatic or heterocyclic radical of a primary monoamine, which may contain up to 12 carbon atoms, preferably up to 6 carbon atoms, and which may be substituted by OH or lower alkyl groups.

The ratio of $n:m$ is 90:10 to 60:40, the sum $n+m$ (polymerisation degree of the maleic acid anhydride copolymer) shall range between 50 and 500.

The polyimidamines (II) used as starting material can be prepared according to known methods from polymers and copolymers of maleic acid anhydride by the reaction with mixtures of primary-tertiary polyamines with primary monoamines. For example, copolymers of maleic acid anhydride with ethylene, isobutylene, styrene, vinyl acetate and other monomers which can be copolymerised with maleic acid anhydride are suitable for these reactions. However, these compounds must not contain groups which give interfering side reactions in the subsequent reaction with primary-tertiary amines.

These copolymers are especially very easily obtainable by an alternating copolymerisation when the molar ratio of the components is 1:1.

Suitable primary-tertiary amines A—$NH_2$ are, for example, aliphatic diamines, such as N,N-dimethylethylene-diamine, N,N-diethylpropylene-diamine, 2-amino-5-diethylamino pentane; or other diamines, such as N,N-diethyl-bis-(3-aminopropylether); or aromatic amines, such as N,N-dimethyl-p-phenylene-diamine and p-dimethyl-amino-benzylamine; or also heterocyclic amines, such as N-(3-aminopropyl)-piperidine, N-(3-aminopropyl)-morpholine and aminoalkyl derivatives of pyridine. The primary-tertiary amines may also contain several tertiary amino groups in the molecule, for example N-methyl-N'-(3-aminopropyl)-piperazine, whereby the number of N-oxide groups in the final product is increased. It is further possible to use mixtures of different primary-tertiary amines for the reaction with the maleic acid anhydride copolymer.

Suitable monoamines B—$NH_2$ are, i.e., ethylamine, cyclohexylamine, aniline, or also hydroxyamines, such as ethanolamine, tri-(hydroxymethyl)-aminomethane and glucamine. Aminoethers, such as γ-aminopropyl ether, or amino derivatives of heterocycles, such as aminopyranes, or aminothiephenes can be used. The use of mixtures of the aforesaid amines is also within the scope of the invention.

The oxidation of the polyimidamines II according to the invention to form poly-N-oxides is expediently carried out at temperatures between 20 and 100° C., in suitable solvents and with hydrogen peroxide as oxidising agent. Suitable solvents are aqueous acids which are stable to oxidation, and an excess of the acid should be avoided as far as possible. Furthermore, lower aliphatic alcohols, such as isopropyl alcohol, or also organic acids, such as acetic acid, are generally well suited as solvents. However, other organic solvents, for example, dioxan or acetone, can also be used. The hydrogen peroxide is normally used in the form of a 30% aqueous solution and it can be replaced, if desired with other oxidising agents, for example, per-acids as peracetic- or perbenzoic acid or ozone.

The polyimidaminoxides II can further be prepared by cyclising the poly-α-carboxy-amidaminoxides III. This is carried out by heating them in substance or in solution to temperatures between 90 and 120° C., expediently with removal of the reaction water. The poly-α-carboxy-amidaminoxides III are produced by preparing poly-α-carboxy-amidamines according to the process of U.S. patent specifications Nos. 2,077,398; 2,165,845 or 3,157,595 and oxidising as described above.

EXAMPLES

In the following Examples, a coplymer of styrene and maleic acid anhydride was reacted with mixtures of N,N-dimethylpropylene-diamine (A—$NH_2$) and a primary monoamine (B—$NH_2$) in the molar ratio as stated and with the use of isopropyl alcohol as solvent at 160° C. to form the polyimidamine, and the resultant solution was oxidised at 50° C. with a 1½-fold molar excess of hydrogen peroxide to form the polyimidamino oxide. The solution was freed from the solvent and from hydrogen peroxide by dialysis against water and divided into fractions of uniform molecular weight by fractional precipitation with acetone.

The values for $T/C$ were obtained by the test described by Schlipköter and Brockhaus (cf. Klinische Wochenschrift 39 (1961), 1182).

In this test, a suspension of active quartz is introperitoneally applied to rats. Later, but at the same day, 1.0 cc. of a 2% solution of the respective preparation is subcutaneously administered, and this administration is repeated three times. The silicotic increase in weight of the omentum, as compared with untreated animals, is measured after 3 months. For evaluation of the quotient $$T/C = \frac{\text{treated}}{\text{untreated}}$$

it must be taken into account that $T/C=1$ for an ineffective preparation, whereas a value of $T/C=0.20$ was found for the optimum effect of a preparation in control tests without application of quartz. The viscosity number was determined in a 0.9% sodium chloride solution and converted to ideal solvent.

| Number: | Monoamine (B—NH₂) | Mole percent | η | T/C |
|---|---|---|---|---|
| 1 | CH₃—CH₂—NH₂ | 50 | 0.09 | 0.22 |
| 2 | —NH₂ | 17 | | 0.23 |
| 3 | Same as above | 34 | | 0.24 |
| 4 | OH—CH₂CH₂—NH₂ | 67 | 0.20 | 0.70 |
| 5 | OH—CH₂CH₂—NH₂ | 50 | 0.38 | 0.76 |
| 6 | OH—CH₂CH₂—NH₂ | 50 | 0.51 | 0.17 |
| 7 | OH—CH₂CH₂—NH₂ | 33 | 0.19 | 0.19 |
| 8 | D-Glucamin | 50 | 0.13 | 0.59 |
| 9 | (HOCH₂)₃C—NH₂ | 50 | 0.13 | 0.23 |
| 10 | (HOCH₂)₂ <br> \C—NH₂ <br> / <br> CH₃ | 50 | 0.14 | 0.19 |
| 11 | CH₃O—(CH₂)₃—NH₂ | 50 | 0.09 | 0.26 |

What is claimed is:

1. Poly-N-oxides of the formula

in which Z denotes the monomer unit of a vinyl compound of the formula

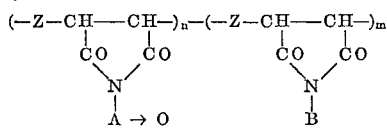

wherein $R^1$ is hydrogen or $CH_3$ and $R^2$ is hydrogen, phenyl $CH_3$ or $OCOCH_3$; A→O is the residue of a primary-tertiary diamine wherein the tertiary amino group has been oxidized to N-oxide, A having having the general formula

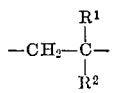

wherein $R^3$ is alkylene of up to 7 carbon atoms,

—(CH₂)₃—O—(CH₂)₃— phenylene or benzylene, $R^4$ and $R^5$ are lower alkyl of 1 to 4 carbon atoms, or $R^4$ and $R^5$ together with the nitrogen atom form a piperidine or morpholine ring; B is an alkyl group of up to 6 carbon atoms, an alkyl group of up to 6 carbon atoms containing one to five hydroxy groups, cyclohexyl, CH₃O(CH₂)₃—, or phenyl; $n$ and $m$ are integers, whereby the ratio of $n{:}m$ is 90:10 to 60:40 and the sum of $n+m$ (polymerization degree of the maleic acid anhydride copolymer) is between 50 and 500.

2. A poly-N-oxide according to claim 1, wherein $R^1$ is hydrogen, $R^2$ is phenyl, $R^3$ is propylene, $R^4$ and $R^5$ are each methyl, and B is ethyl.

3. A poly-N-oxide according to claim 1, wherein $R^1$ is hydrogen, $R^2$ is phenyl, $R^3$ is propylene, $R^4$ and $R^5$ are each methyl, and B is phenyl.

4. A poly-N-oxide according to claim 1, wherein $R^1$ is hydrogen, $R^2$ is phenyl, $R^3$ is propylene, $R^4$ and $R^5$ are each methyl, and B is hydroxyethyl.

5. A poly-N-oxide according to claim 1, wherein $R^1$ is hydrogen, $R^2$ is phenyl, $R^3$ is propylene, $R^4$ and $R^5$ are each methyl, and B is 1,2,3,4,5-pentahydroxyhexyl.

6. A poly-N-oxide according to claim 1, wherein $R^1$ is hydrogen, $R^2$ is phenyl, $R^3$ is propylene, $R^4$ and $R^5$ are each methyl, and B is (HOCH₂)₃C—.

7. A poly-N-oxide according to claim 1, wherein $R^1$ is hydrogen, $R^2$ is phenyl, $R^3$ is propylene, $R^4$ and $R^5$ are each methyl, and B is

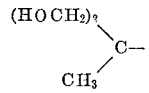

8. A poly-N-oxide according to claim 1, wherein $R^1$ is hydrogen, $R^2$ is phenyl, $R^3$ is propylene, $R^4$ and $R^5$ are each methyl, and B is CH₃O(CH₂)₃—.

References Cited

UNITED STATES PATENTS

| 2,500,131 | 3/1950 | Linsker | 260—279 |
| 2,518,130 | 8/1950 | Evans et al. | 260—250 |
| 2,785,170 | 3/1957 | Kagan | 260—296 |
| 2,785,171 | 3/1957 | Birkenmeyer | 260—296 |
| 3,184,309 | 5/1965 | Minsk et al. | 96—29 |

OTHER REFERENCES

Culvenor: "Amine Oxides," "Rev. of Pure & App. Chem.," vol. 3, 88–114 (1953), pp. 83, 86, 87, 91.

ALEX MAZEL, Primary Examiner

J. A. NARCAVAGE, Assistant Examiner

U.S. Cl. X.R.

260—247.2, 268, 294, 294.9, 295, 999